(12) United States Patent
Inagaki et al.

(10) Patent No.: US 6,562,754 B1
(45) Date of Patent: May 13, 2003

(54) PROCESS FOR MAKING AN ADSORBENT

(75) Inventors: Koji Inagaki, Toyota (JP); Masaru Urushihara, West Bloomfield, MN (US); Yasushi Kouno, Nagoya (JP); Atsushi Kosaka, Okazaki (JP); Hideaki Sato, Anjo (JP); Yoshiki Chujo, Kyoto (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/527,713

(22) Filed: Mar. 17, 2000

(30) Foreign Application Priority Data

Mar. 19, 1999 (JP) .......................... 11-076667
Sep. 7, 1999 (JP) .......................... 11-252930

(51) Int. Cl.⁷ .............................. B01J 20/22
(52) U.S. Cl. ..................... 502/401; 502/407
(58) Field of Search ................. 502/400, 401, 502/407, 415, 150, 152

(56) References Cited

U.S. PATENT DOCUMENTS

| | | | | | |
|---|---|---|---|---|---|
| 5,079,274 A | * | 1/1992 | Schneider et al. | .......... | 521/146 |
| 5,599,759 A | * | 2/1997 | Inagaki et al. | .............. | 423/325 |
| 5,744,421 A | * | 4/1998 | Robinson et al. | .......... | 502/416 |
| 6,297,293 B1 | * | 10/2001 | Bell et al. | ............... | 423/445 R |

FOREIGN PATENT DOCUMENTS

| | | |
|---|---|---|
| JP | A-5-310413 | 11/1993 |
| JP | A-6-322278 | 11/1994 |
| JP | B2-2574049 | 10/1996 |

\* cited by examiner

*Primary Examiner*—Stanley S. Silverman
*Assistant Examiner*—Edward M. Johnson
(74) *Attorney, Agent, or Firm*—Harness, Dickey & Pierce, P.L.C.

(57) ABSTRACT

An adsorbent which desorbs water by being heated and adsorbs water by being chilled, comprising a porous body having a pore volume of not less than 0.2 cm³/g and a pore size from 0.6–1.6 nm. This adsorbent is good for an adsorptive-type refrigeration apparatus, used in an automotive air conditioner, which has an adsorbing core.

1 Claim, 4 Drawing Sheets

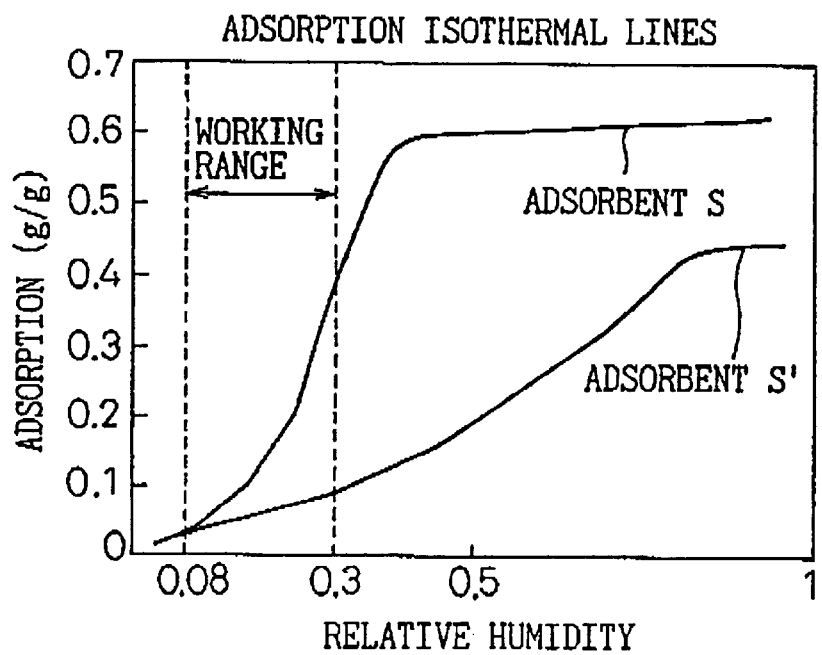
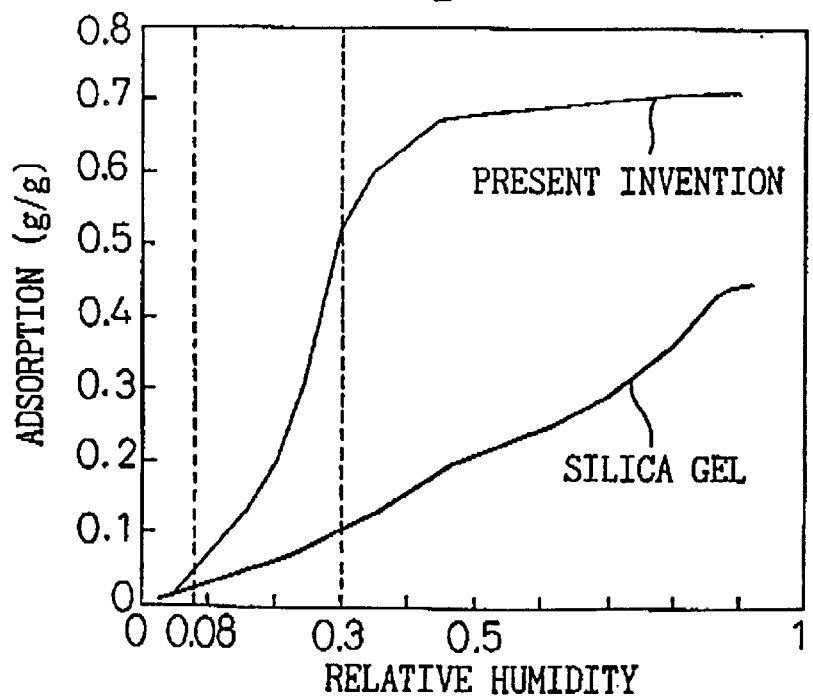

PROCESS FOR MAKING AN ADSORBENT

BACKGROUND OF THE INVENTION

1. Field of the Invention

The invention relates to an adsorbent, its preparation and an air conditioner.

2. Description of Related Art

An adsorptive-type refrigeration apparatus which has an adsorbing core with an adsorbent for adsorbing water by being chilled and for desorbing water by being heated, and which has an evaporative condenser for evaporating and condensing water is known in the art.

In such a refrigeration apparatus, when water is adsorbed by an adsorbing core, water is vaporized in the evaporative condenser. On this occasion, the inside air is chilled by circulating the heat exchanging fluid, which is heat-exchanged with water in the evaporative condenser, to the inside heat exchanger. Further, the adsorbing core which has the adsorbed water is heated to desorb water so as to be generated. At this time, the desorbed water is condensed in the evaporative condenser.

When such an adsorptive-type refrigeration apparatus is installed in the automotive and the like, engine coolant water (about 90° C.), for example, is used as the heating source to desorb water from the adsorbing core. On the other hand, as the cooling source to chill the adsorbing core so as to adsorb water, for example, engine coolant water (about 30° C.) which is chilled in the outside heat exchanger or the heat exchanging fluid which is chilled by low-side water (e.g. about 20~25° C.) of a vapor compressive-type refrigeration cycle separately accommodated, is used. For that, when the above-mentioned adsorptive-type refrigeration is applied to an automotive air conditioner, desorbing and adsorbing of water are carried out at relative humidity ranging from 0.08 to 0.30 in the neighborhood of the adsorbent.

As the adsorbent used in such an adsorptive-type refrigeration apparatus, for example, silica gel, which is obtained by firing silicic oxide, has been used.

However, when zeolite is used as an adsorbent material, it is necessary to be heated up to about 400° C. at atmospheric pressure in order to desorb water adsorbed.

Therefore, when the adsorptive-type refrigeration apparatus is stalled in an automotive and the like, there existed a problem in that it is difficult to obtain the heating source for generating the adsorbent.

Further, when above-mentioned silica gel is used as the adsorbent, its pore size has a wide pore size distribution ranging 1.0~15 nm, but pore volume at pore size of 1.0~1.6 nm is small, that is 0.05 cm$^3$/g.

Therefore, there also existed a problem in that it is difficult to obtain the sufficient latent heat of vaporization from the heat exchanging fluid passing the evaporative condenser because insufficient adsorption of water is carried out in the above-mentioned region of low humidity.

For this reason, increased amount of silica gel in the adsorbing core requires to be packed for sufficient cooling capacity to chill the inside. Consequently, there existed a problem in that the adsorbing core becomes to be of larger size, so is not good for stalling in an automotive.

SUMMARY OF THE INVENTION

In view of the foregoing, it is an object of the present invention to provide an adsorbent, which can amply desorb and adsorb water to cool the inside even in the region of low humidity in the neighborhood of the adsorbent, its preparation and an air conditioner.

In a first aspect of the present invention, there is provided an adsorbent which desorbs water by being heated and adsorbs water by being chilled, comprising; a porous body having pore volume of not less than 0.2 cm$^3$/g at pore size from 0.6nm to 1.6 nm.

In a second aspect of the present invention, there is provided an adsorbent which desorbes water when heated and adsorbs water when chilled, said adsorbent being a porous complex comprising an organic compound which is phase transitionable for sol-gel by temperature changes and an ignorgabic compound which has a three-dimensional network structure, and said organic compound is dispersed in said structure.

In a third aspect of the present invention, there is provided a process for producing an adsorbent comprising the step of: gelating a metallic compound by hydrolysis and polycondensation;

polymerizing a monomer containing carbon-carbon multiple bonds in the same reaction system as this to form an inorganic-organic complex where a resulting polymer is uniformly dispersed in a three-dimensional micro network structure of a metallic oxide gel formed by said hydrolysis; and removing said polymer from said inorganic complex to obtain a porous body.

In a fourth aspect of the present invention, there is provided an air conditioner, comprising:

a radiator for chilling the heat exchanging fluid; an adsorbing core having an adsorbent which adsorbs water chilled by the heat exchanging fluid which is chilled in said radiator, and which desorbs water when heated by heating means;

an evaporative condenser which evaporates water when water is adsorbed by said adsorbing core, and which condenses water when water is desorbed by said adsorbing core;

and an inside heat exchanger for heat exchanging between the inside air and the heat exchanging fluid chilled by being taken the latent heat of evaporation in said evaporative condenser when water is adsorbed by said adsorbing core;

characterized in that the adsorbent according to claim 1 is used as said adsorbent.

In a fifth aspect of the present invention, there is provided an air conditioner, comprising: an adsorbing core having an adsorbent; a temperature controller for controlling temperature of said adsorbing core; an evaporative condenser; an inside heat exchanger; a communicating section;

and a circulating passage for circulating the heat exchanging fluid between said evaporative condenser and said inside exchanger;

characterized in that said adsorbent has properties which it desorbs water when heated, and which it adsorbs water when chilled;

said evaporative condenser evaporates water when water is adsorbed by said adsorbing core, and condenses water when water is desorbed;

said heat exchanging fluid is chilled by being taken the latent heat of evaporation in said evaporative condenser when water is evaporated to be heat-changed with the inside air in said inside heat exchanger.

said evaporative condenser evaporates water when water is adsorbed by said adsorbing core, and condenses water when water is desorbed;

said heat exchanging fluid is chilled by being taken the latent heat of evaporation in said evaporative condenser when water is evaporated to be heat-changed with the inside air in said inside heat exchanger;

and the adsorbent according to claim 1 is used as said adsorbent.

BRIEF DESCRIPTION OF THE INVENTION

In order to more fully understand the drawings used in the detailed description of the present invention, a brief description of each drawing is provided.

FIG. 4 shows water adsorption isothermal lines with respect to the adsorbent;

FIG. 5 shows water adsorption isothermal lines with respect to another adsorbent.

DETAILED DESCRIPTION OF THE INVENTION

An adsorbent, according to claim 1 of the present invention, comprises a porous body having pore volume of not less than 0.2 cm$^3$/g at pore size of 0.6~1.6 nm. When a porous body of pore size less than 0.6nm is used as the adsorbent, water is adsorbed by the adsorbent even if relative humidity is less than 0.08 in the neighborhood of the adsorbent, so more heat is required to generate said adsorbent. On the other hand, when a porous body of pore size more than 1.6 nm is used, sufficient adsorption cannot be achieved at relative humidity of 0.30 there because it is hard to be adsorbed. Preferably, pore volume is not less than 0.35 cm$^3$/g at pore size of 0.6~1.6 nm to obtain more sufficient adsorption.

Such a porous body is prepared, for example, by a process. Namely, hydrolysis and polycondensation of a hydrolizable and polymerizable metallic compound and polymerization of a monomer containing carbon-carbon multiple bonds are carried out in the same reaction system, or said metallic compound is reacted in the reaction system containing a hydrophilic polymer. Consequently, the polymer can be uniformly dispersed in a three-dimensional structure of a metallic oxide gel without aggregation.

Preferably, as above-mentioned monomer containing carbon-carbon multiple bonds and a hydrophilic polymer, a compound with at least one functional group such as amido, urethane, amino, hydroxyl, carboxyl, sulfonic acid and ester group, is used.

Further, according to the present invention, the adsorbent is a porous complex comprising an organic compound which is sol-gel phase transionable by temperature changes and an inorganic compound which has a three-dimensional network structure, and said organic compound is dispersed in said structure.

This adsorbent is a porous complex, and water is adsorbed and desorbed by the capillary condensation and the sol-gel phase transition. Said sol-gel phase transition of the adsorbent arises from temperature changes. "sol-gel phase transition by temperature changes" means that the adsorbent changes to a sol at higher temperature than the phase transition temperature and a gel at lower temperature. With this phenomenon, the adsorbent adsorbs water to swell at lower temperature, and desorbs to contract. Such adsorbing and desorbing are reversibly arisen, and there is said transition temperature between the adsorption temperature and the desorption temperature.

Figure 1:
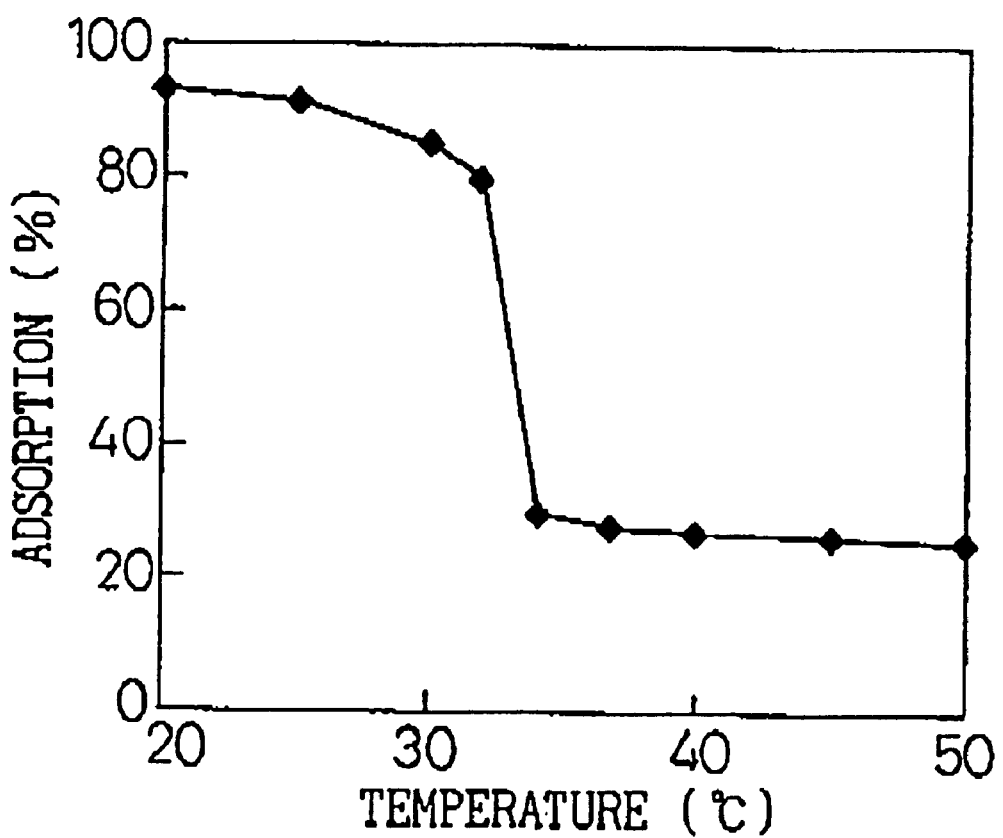
FIG. 1 shows a sol-gel phase transition of an organic compound used in the present invention.

The following is a sample of such phenomenon, where a crosslinked polymer of N-isopropylamide is used as the adsorbent. As shown in FIG. 1, a crosslinked polymer of N-isopropylamide has the sol-gel transition temperature of about 35° C., consequently they become to be a gel at lower temperature (e.g. 20° C.) than said temperature and to be a sol at higher temperature (e.g. 40° C.) than said temperature.

When it is under the circumstances of lower temperature and high humidity, water molecules, first, enter the inside of pores of the porous adsorbent by capillary phenomenon. At this point, a lot of water molecules are adsorbed around polymer chains of an organic compound which presents inside of pore walls, and pores are filled with water.

Further, if temperature is raised and humidity is reduced from this condition, water molecules inside pores are desorbed and then water molecules adsorbed inside pore walls are desorbed by the sol-gel transition.

Like this, the adsorbent of the present invention has a function making the difference of adsorption amount by capillary phenomenon based on humidity changes and a function making the sol-gel transition by temperature changes.

Therefore, the adsorbent of the present invention may adsorb water under the circumstance of lower temperature than the phase transition temperature of the adsorbent and of high humidity, and desorb water under the circumstance of higher temperature and low humidity. Hence, said adsorbent, which has these functions together, displays higher adsorbing-desorbing capacity than said functions are used separately.

Consequently, the adsorbent in the present invention is more excellent in adsorptivity and desorptivity.

As mentioned above, the adsorbent obtained according to the present invention has high efficiency of water adsorption at low humidity to effectively adsorb and desorb water.

An organic compound in the present invention may have a property to make a sol-gel transition by temperature changes. Such a compound may be preferably a polymer which has a intramolecular, hydrophilic group and hydrophobic group, as described, to adsorb and desorb water efficiently.

As described, said organic compound is preferably a crosslinked polymer. Said polymer has a property to solvate and swell by adsorbing water. According to the present invention, such a swellable polymer is dispersed in a three-dimensional network of an inorganic compound. A crosslinked polymer is thus located to twist its way through the net of a three-dimensional network structure of an inorganic compound. Therefore, said structure works as a firm support of a crosslinked polymer and captures said polymer. Thus, said polymer does not escape from said structure of an inorganic compound. Therefore, swelling of said polymer, when water is adsorbed, may be restrained to the utmost, said polymer being less swelled than free polymer.

Consequently, the adsorbing core housing the adsorbent may be miniaturized. Above-mentioned "crosslinked polymer" is understood a polymer which is connected to each other by cross-linking.

As described, said organic compound preferably includes at least one compound selected from the polymer consisting poly(N-isopropylacrylamide), poly(N-t-butylacrylamide), poly(N,N-diethylacrylamide), polyethyleneglycol, cellulose or polymethylvinylether, or the crosslinked polymer thereof. Water is thus adsorbed and desorbed effectively.

Further, the sol-gel phase transition temperature of said organic compound ranges preferably in 30~60° C. Water may be thus properly adsorbed and desorbed corresponding to working circumstances.

Said inorganic compound is required to have a three-dimensional network structure. Preferably, as such an inorganic compound to be used, at least one compound selected from the group consisting silica($SiO_2$), alumina($Al_2O_3$), titania($TiO_2$) and zirconia($ZrO_2$) is used Further, said "three-dimensional network structure" is understood a firm structure having a three-dimensional, mesh-like structure.

Above-mentioned adsorbent is a porous complex consisting of said organic compound and said inorganic compound.

Such a porous complex has preferably a pore character of pore volume of not less than 0.20 $cm^3/g$ at pore size of 1.0~1.5 nm to adsorb and desorb water efficiently.

Further, for example, as described, said adsorbent may prepared by the step as follows: mutually dissolving an organic compound which is sol-gel phase transitionable by temperature changes with a solvent-extractive organic compound in a three-dimensional network structure of an inorganic compound to obtain a complex containing said inorganic compound, said transitionable organic compound and said extractive organic compound; and forming a porous body by extracting said extractive organic compound with a solvent from said complex.

According to this invention, a solvent-extractive organic compound, an organic compound which is phase transitionable for sol-gel and an inorganic compound having a three-dimensional network structure are mixed to form a complex consisting of ternary hybrids, following that a solvent-extractive organic compound is removed by solvent extraction.

Thus, a resulting porous complex have many pores in a three-dimensional network structure, in which a phase transitionable organic compound is still left.

Such a process to form a porous complex having pores by using a solvent-extractive organic compound makes a recovery of said organic compound in the process possible, and more easily retain hydroxyl group in an inorganic compound as compared with removal by burning down. For the reason, as hydrogen bond of said hydroxyl group and water is apt to be formed, water may be more efficiently adsorbed.

As a solvent-extractive organic compound, for example, at least one compound selected from the group consisting of poly(N,N-dimethylacrylamide), poly(N-isopropylacrylamide), poly(N-t-butylacrylamide), poly(N,N-dimethylacrylamide), poly(N,N-diethylacrylamide), polystylene, polyvynylchioride, poly(2-methyl-2-oxazoline), poly(2-ethyl-2-oxazoline), or poly(1-vynyl-2-pyrrolidone).

Thus, it is possible to extract by water or an organic solvent.

Further, in the step of obtaining a complex, preferably as described, a uncrosslinked substance, which may be a phase transitionable (for sol-gel) organic compound, are crosslinked in the presence of said inorganic compound and said extractive organic compound. Said uncrosslinked substance is mixed with said inorganic compound and said extractive organic compound, consequently said substance and said an organic compound mutually dissolve in a three-dimensional network structure of an inorganic compound. In this state, if a uncrosslinked substance is crosslinked, a crosslinked polymer is formed to disperse in a three-dimensional network structure. So, when a solvent-extractive organic compound is removed from this complex, the crosslinked polymer comes to captured and supported by a three-dimensional network structure. Thus, said polymer do not escape from the structure of an inorganic compound, and swelling of said polymer may be restrained to the utmost when water is adsorbed. Consequently, the adsorbing core housing the adsorbent may be miniaturized.

Above-mentioned uncrosslinked substance may be a monomer or a polymer. When a monomer is used, polymerization and crosslinking are carried out in a three-dimensional network structure of an inorganic compound. When a polymer is used, crosslinking is carried out in said structure.

As a uncrosslinked polymer, poly(N-isopropylacrylamide), poly(N-t-butylacrylamide), poly(N,N-dimethylacrylamide), poly(N,N-diethylacrylamide), polyethyleneglycol, cellulose, or polymethylene may be preferably used.

Above-mentioned "crosslink uncrosslinked material" is understood that a polymer is crosslinked each other by a crosslinking agent, or a monomer is polymerized and a resulting polymer is subsequently crosslinked, using a polymerization agent and a crossliking agent.

In the present invention, there is provided an air conditioner for heating by heating means to desorb water and generate adsorbent, chilling the adsorbent by the heat exchanging fluid cooled by the radiator, evaporating water in above-mentioned evaporative condenser, and consequently taking the latent heat of evaporation, in which the adsorbent according to claim 1 is used as said adsorbent.

When an adsorptive-type refrigeration apparatus is, in this way, applied to an automotive air conditioner, the heat exchanging fluid (80~100° C.) is usually used as heating means for desorbing water. Consequently, when water is desorbed, relative humidity come to be about 0.08 in the neighborhood of the adsorbent. However, according to the present invention, even if the heat exchanging fluid is usual one (about 80~100° C.) as above-mentioned, water can be desorbed. On the other hand, as the cooling source for adsorbing water, the heat exchanging fluid (about 30° C.) chilled by the radiator is usually used. Therefore, when water is adsorbed, relative humidity comes to be about 0.30 in the neighborhood of the adsorbent. Also in this case, according to the present invention, even if said humidity is low, sufficient adsorption can be carried out.

Therefore, the latent heat of evaporation is so sufficiently taken that sufficient cooling capacity is achieved to air-condition the inside.

In another preferred embodiment, as described, said adsorbent is applied to an air conditioner, comprising: an adsorptive core having the adsorbent; a temperature controller for controlling temperature of said adsorptive core; an evaporative condenser; an inside heat exchanger; a communicating section; a circulating passage for the circulating heat exchanging fluid between said evaporative condenser and said inside exchanger; and said adsorbent having a property which it desorbs water when heated and adsorbs water when chilled;

said evaporative condenser evaporates water when water is adsorbed by said adsorbing core, and condenses water when water is desorbed;

said heat exchanging fluid is chilled by being taken the latent heat of evaporation in said evaporative condenser when water is evaporated to be heat-changed with the inside air in said inside heat exchanger.

In this preferred embodiment, the adsorbent packed in said air conditioner is properly controlled to be heated or cooled repeatedly by the temperature controller. When temperature in the adsorbing core is lowered by said controller, the adsorbing core, the communicating section and the evaporative condenser. Inside pressure is also lowered as the communicating section falls in humidity.

Consequently, liquid water in the evaporative condenser also evaporates. At this time, the heat exchanging fluid in said condenser is cooled because the latent heat of evaporator is taken by evaporated water. Such cooled fluid is flowed into the inside heat exchanger, where said fluid is heat-exchanged with the inside air, consequently the inside is air-conditioned. On the other hand, when temperature in the adsorbing core is increased by said controller, water adsorbed by the adsorbent is evaporated to be desorbed from the adsorbent, and the adsorbent is thus generated. Evaporated water is flowed, via the communicating section, into the evaporative condenser, where said water is condensed to become liquid water because the heat exchanging fluid takes heat from it. As the temperature recycle of the adsorbing core is repeated by said controller, water is adsorbed by the adsorbent, and accordingly water is evaporated and liquefied in the evaporative condenser, further the heat exchanging fluid is successively cooled due to the latent heat of evaporation of water. Further, when heat-exchanged with the inside air, the inside is air-conditioned.

According to the present apparatus, in this way, continuous cooling of the inside can be achieved when said temperature controller repeats the high-low temperature cycle of the adsorbing core at a certain interval. The adsorbent, having excellent adsorption-desorption capacity for water, is used in the present apparatus as previously described. This adsorbent efficiently adsorbs and desorbs water circulating between the adsorbing core and the evaporative condenser.

According to this apparatus, there can be provided an air conditioner for more excellent cooling. Said controller has the heating source and the cooling source in the present apparatus. As the beating source, for example, the engine coolant water which is obtained after cooling the engine can be used. As the cooling source, for example, the engine coolant water after chilling the outside and the refrigeration cycle can be used. As the adsorbing core, for example, a support body of good conductivity housing the adsorbent can be used. The adsorbing core, the evaporative condenser and the communicating section which are circulated between said core and said condenser may be a pair or more pairs.

The temperature controller preferably makes the temperature of the adsorbent in the adsorbing core have a temperature recycle of repeating at temperatures which are between higher temperature than the sol-gel phase transition temperature and lower temperature, at a certain interval. For this, the adsorption and desorption capacity can be effectively achieved and efficiently chilled the inside.

Further, time for one temperature cycle is, for example, preferably 1~30 minutes. Less than 1 minute is undesirable as it may cause to drop the cooling capacity per 1 cycle because of the insufficient adsorption of water. More than 30 minutes is also undesirable as it may cause to drop the cooling capacity per hour because of the lowering of the latent heat of evaporation per hour.

In the above-mentioned air conditioner, the adsorbent prepared as described used to constitute the same conditioner as described.

Adsorbent in the present invention is also applied to a ventilating air cleaner and a dehumidifier and the like. When said adsorbent is applied for an automotive air conditioner, above mentioned transition temperature is preferably selected from the temperature of 40~60° C. to achieve more effective cooling.

A preferred embodiment of an automotive air conditioner is provided, in which the adsorbent of the present invention is applied. In FIG. 2, an automotive air conditioner 1 is installed, for example, under an inside instrument panel. An air conditioning duct 2 of said conditioner 1 is a passage to supply air for conditioning into the inside and inlets 4,5 to supply air are equipped in one end of said duct 2. Said inlets 4,5 are switched by an air inlet door 6 to open and close. Air is blown into said duct 2 driving a centrifugal fan 3b of a blower 3 by a motor 3a. On the other hand, an interior heat exchanger 16 (hereinafter referred to as inside heat exchanger) and a heater core 31 are equipped in the downstream of the blower 3. An inside heat exchanger 16 chilled air in said duct 2 by the heat exchanging fluid which is cooled by evaporative condensers 60, 70 of an adsorptive-type refrigeration cycle 100 mentioned after. A heater core 31 makes the heated engine coolant water circulate to heat the air in said duct 2. Air volume passing through the heater core 31 and air volume by passing through the heater core 31 are adjusted by air mix door 31a to control the inside temperature.

The adsorptive-type refrigeration cycle 100 is equipped with the first and second adsorbing cores 20,30, and the first and second evaporative condensers (evaporator, condenser) 60, 70. The first adsorbing core 20 and the first evaporative condenser 60 are accommodated the inside of a closed vessel 601, and the second adsorbing core 30 and the second evaporative condenser 70 are accommodated the inside of a second closed vessel 602. Water of a given amount is enclosed inside of the first and the second closed vessels 601, 602 respectively. The first and second closed vessels 601, 602 have the first and second adsorbing core chambers 62, 63 housing the first and second adsorbing cores 20, 30 and the first and second evaporative condenser chambers 66, 67 housing the first and second evaporative condensers 60, 70. Further, the first and second closed vessels 601, 602 have the first and second communicating sections 86, 87 where the first and second adsorbing core chambers 66, 67 are communicated with the first and second evaporative condensers 60, 70.

The first and second evaporative condensers 60, 70 are apparatuses for evaporating and condensing water. When one works as an evaporator for evaporating water, another works as a condenser for condensing water.

The first and second evaporative condensers 60, 70 are connected to the inside heat exchanger 16, via the second fluid circulating passage b for circulating the heat exchanging fluid.

Figure 3A:
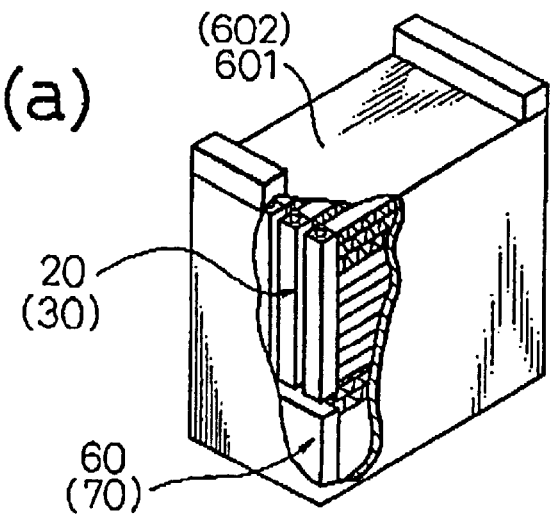
FIG. 3 shows a partially sectional view of a closed vessel (FIG. 3(a)) and perspective views of an adsorbing core (FIG. 3(b) and FIG. 3(c))
Figure 3B:
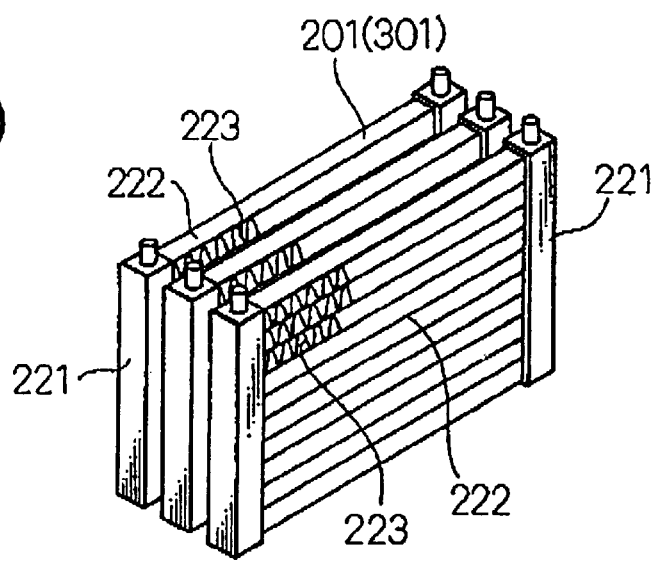
Figure 3C:
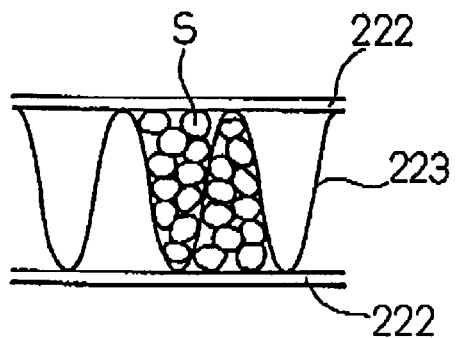

As shown in FIG. 3(a)~(c), in the heat exchanger sections 201, 202 of the first and second adsorbing cores 20, 30, more than one, depressed tube 222 in which the heat exchanging fluid (e.g. engine coolant water) flows, and corrugated heat transfer fin 223 are laminated alternately between header tanks 221 equipped at both ends of said sections.

The space formed between tube 222 and heat transfer fins 223 is filled with the adsorbent S of the present invention.

The adsorbent S has particles of a uniform size, which are obtained by granulated adsorbent powder, and said granules are fixed to the surface of tube 222 and heat transfer fins 223, using adhesives (e.g. epoxy resin).

In FIG. 3(b), from among heat exchanger sections 201, 301 of the adsorbing cores 20, 30, only the tube 22 is shown to be simplified.

As shown in FIG. 2, the engine E, the heat exchanger sections 201 (or 301) of the first adsorbing core 20 (or the second adsorbing core 30), the heater core 31 and the radiator 32 are connected in series by piping to constitute the second fluid circulating passage b.

The heat exchanger 201 (or 301) of the adsorbing core evaporative condenser cooler, which is a radiator, mentioned after (as used hereafter, "adsorbing core cooler") 25 and the first adsorbing core 20 (or the second adsorbing core 30) are connected in series by piping to constitute the third fluid circulating passage (the fluid circulating passage for cooling) c.

Steam compressive-type refrigeration cycle 200 (mentioned after), the adsorbing core cooler 25 and the first evaporative condenser 60 (or the second evaporative condenser 70) are connected in series by piping to constitute the fourth fluid circulating passage (fluid circulating passage for cooling) d.

The third fluid circulating passage c and the fourth fluid circulating passage d meet at the junction e and branch at the branch point f. Above-mentioned adsorbing core cooler 25 is equipped at the junction g which is downstream of the junction e and upstream of the junction f.

Figure 2A:
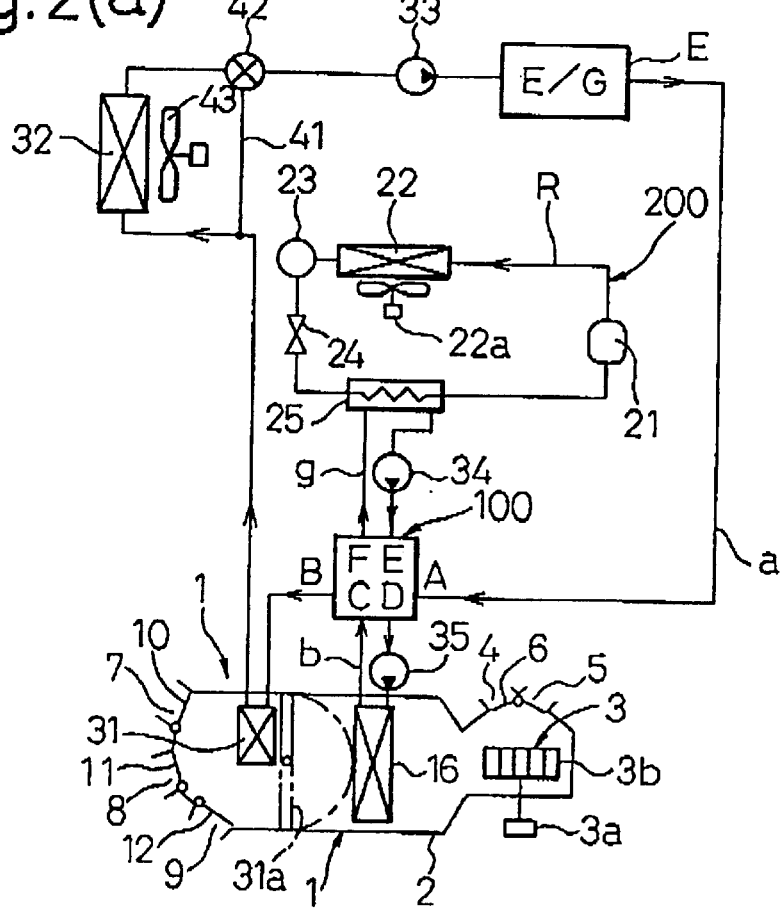
FIG. 2(a) is a schematic view showing an overall structure of an air conditioner according to a preferred embodiment of the present invention.

Further, electric pumps 33, 34, 35 are respectively equipped in the first fluid circulating passage a, the junction g and the second fluid circulating passage b, and they generate the flow of the heat exchanging fluid in the direction of arrow in FIG. 2(a).

On the way of the first and third fluid circulating passages a, c, the four-way valves 36, 37 are equipped. By these valves 16, 17, a supplying source of the heat exchanging fluid flowing into the first and adsorbing cores 20, 30 may be switched to the engine E or the adsorbing core cooler 25. Namely, adsorbing and desorbing process of the first and second adsorbing cores 20, 30 may be switched by the four-way valves 36, 37.

On the way of fluid circulating passages b and d, four-way valves 38, 39 are equipped. By those valves 38, 39, a supplying destination of the heat exchanging fluid flowing from the first and second evaporative condensers 60, 70 may be switched to the inside heat exchanger 16 or the adsorbing core cooler 25. Namely, evaporating and condensing process of the first and second evaporative condensers 60, 70 may be switched by the four-way valves 38, 39.

The radiator 32 for chilling the engine coolant water equipped outside is cooled by the outside air blown by the blower 43. By the thermostat, when the temperature of the engine coolant water is lower than a certain temperature, said coolant water flows through a bypath circuit 41.

Preferably, the temperature of the first and second adsorbing cores 20, 30 is controlled by the adsorptive-type refrigeration cycle 100 and the steam compressive-type refrigeration cycle 200.

The first and second evaporative condensers 60, 70 evaporate water when water is adsorbed by the first and second adsorbing cores 20, 30, and condense water when water is desorbed by the first and second adsorbing cores 20, 30. The heat exchanging fluid flowing through the circulating passage b is chilled by being taken the latent heat of evaporation in the first and evaporative condensers 60, 70, and is heat-exchanged with the inside air in the inside heat exchanger 16.

The steam compressive-type refrigeration cycle 200 comprises the compressor 21 for compressing a refrigerant, condenser 22 for condensing a refrigerant of high pressure by heat exchanging with the outside air blown by the blowing fan 22a, the receiver 23 for separating the gas and the liquid, the expansion valve 24 for reducing the pressure of a liquid refrigerant, the first and second adsorbing cores 20, 30, and the adsorbing core cooler 25 for cooling the first and second evaporative condensers 60, 70. These sections are connected by piping to constitute a circuit R. Sections of the steam compressive-type refrigeration cycle 200 are stalled outside (inside engine room).

In the adsorbing core cooler 25, the refrigerant passage is formed to contact a refrigerant of low temperature (about 20~25° C.) reduced in pressure by the expansion valve 24 with another refrigerant passing through the junction g. For this, in the adsorbing core cooler 25, the adsorption heat of water in the first and second adsorbing cores 20, 30 and the condensation heat of water in the first and second evaporative condensers 60,70 are taken by a refrigerant of low temperature in the downstream of the expansion valve 24.

Next, the working of said air conditioner are explained. In the adsorptive-type refrigeration cycle 100, the first process, where the first adsorbing core 20 has the adsorbing and the second adsorbing core 30 has the desorbing, and the second process, where the first adsorbing core 20 has the desorbing and the second adsorbing core 30 has the adsorbing, are alternately repeated at every occurrence of a fixed interval.

Figure 2B:
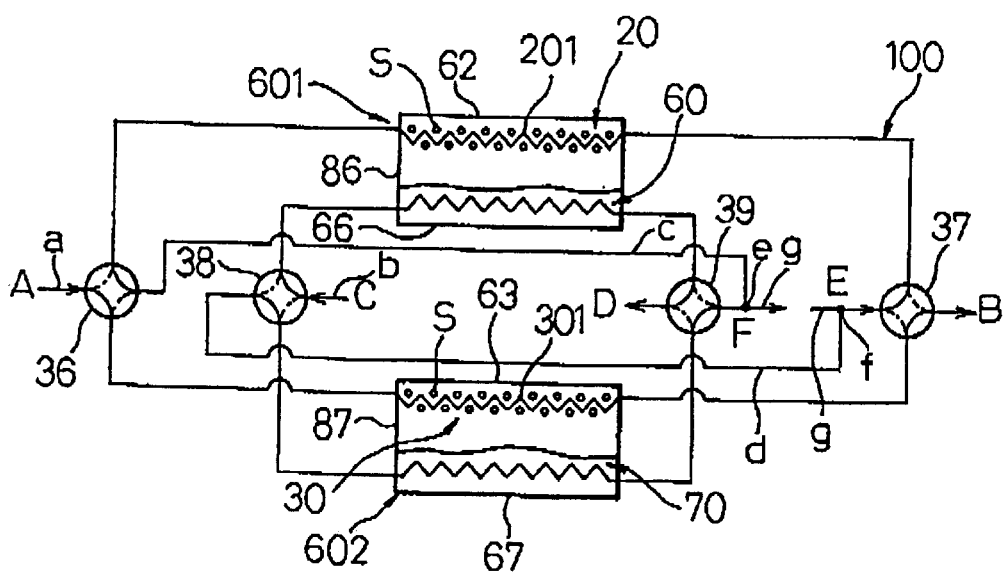
FIG. 2(b) is a schematic view showing a structure of an adsorptive-type refrigeration apparatus.

Namely, the electric pumps 33~35 operate to circulate the heat exchanging fluid to the fluid circulating passage a~d, and the four-way valves 36~39 are in a state shown by solid line in FIG. 2(b) to carry out the first process. In this first process, the engine coolant water (about 90° C.) is circulated to a heat exchanger section 301 of the second adsorbing core 30 via the fluid circulating passage a. Thus, the adsorbent S in the second adsorbing core 30 is heated to desorb water. Water desorbed from the adsorbent S flours into the second evaporative condenser chamber 67.

At this time, as the heat exchanging fluid passing through the second evaporative condenser 70 is cooled by the adsorbing core cooler 25, said water is condensed in the second condenser chamber 67. In this way, relative humidity becomes about 0.08 in the neighborhood of the adsorbent S and the adsorbent S is generated, as water is desorbed from the adsorbent. On the other hand, the first adsorbing core 20 is cooled by said cooler 25, so the adsorbent S in the first adsorbing core 20 adsorbs water. As a result, the space formed by the first adsorbing chamber 62, the first communicating section 86 and the first evaporative condenser chamber 66 decrease in pressure to evaporate water in said chamber 66.

At this time, the heat exchanging fluid is cooled by being taken the latent heat of evaporation by water in the first evaporative condenser 60. This cooled heat exchanging fluid is passed into the inside heat exchanger via the fluid circulating passage b. Accordingly, the air passing through the air conditioning duct 2 is cooled and dehumidified by the cooled heat exchanging fluid passing in the inside heat exchanger 16. Water is adsorbed by the adsorbents and relative humidity becomes about 0.30 in the neighborhood of the adsorbent S.

The four-way valves 36~39 are switched to a state shown by broken lines in FIG. 2(b), and the second process is carried out. In this second process, the first adsorbing core 20 desorbs water which is adsorbed in the first process and the second adsorbing core 30, which is generated in the first process, adsorbs water.

In a preferred embodiment according to claim 1 of the present invention, the adsorbent S is a porous body which has pore volume of not less than 0.2 $cm^3/g$ at pore size of 0.6~1.6 nm and may be prepared, for example, as follows:

Tetramethoxysilane and 0.1 N hydrochloric acid (acid catalyst) were added to methanol solution of N,N-dimethylacrylamide and 2, 2'-azobis(isobutyronitrile) (polymerization initiator), and the resulting mixture was stirred at room temperature for 3 hours to proceed hydrolysis and polymerization. Then, the resulting homogeneous solution was left 60° C. for 3 days so as to polymerize N,N-dimethylacrylamide and evaporate the solvent. Consequently, a colorless, transparent and gellic solid was obtained as an inorganic-organic complex. Then, said complex was fired at 1000° C. for about 24 hours. In this way, a porous body (average pore size of 1.27 nm), which has a pore size of 0.6~1.6 nm, was obtained.

Average pore size and pore volume were determined by the nitrogen adsorption method.

FIG. 4 shows water adsorption isothermal lines with respect to the resulting adsorbents and the comparative adsorbent S' which was obtained by reacting sodium silicate with sulphuric acid and firing the resultant. The adsorbent S' was a porous body of pore volume 0.05$cm^3$/g at pore size of 0.6~1.6 nm.

As previously mentioned, when the adsorptive-type refrigerator apparatus is applied to an automotive air conditioner, relative humidity comes to 0.08~0.30 in the neighborhood of the adsorbent in the adsorbing core. As be seen from FIG. 4, the adsorbent S has the adsorption amount of 0.35 $cm^3$/g, while the adsorbent S' has 0.05 $cm^3$/g, when relative humidity varies from 0.08 to 0.30. Accordingly, the adsorbent S can take the sufficient latent heat of evaporation to chill the inside air, while the adsorbent S' cannot take said sufficient heat.

It is desirable to use a porous body having pore volume of not less than 0.2 $cm^3$/g at pore size of 0.6~1.6 nm. Therefore, the adsorbent may take the sufficient latent heat of evaporation from the heat exchanging fluid with the inside air in the inside exchanger 16 where relative humidity is in the range of 0.08~0.30 in the neighborhood of the adsorbent. When a porous body having pore size of less than 0.6 nm is used as the adsorbent, even if said relative humidity is less than 0.08, it may cause the adsorbent not to be generated because of water adsorption.

On the other hand, when a porous body having pore size of more than 1.6 nm is used, the adsorption amount reduces when said relative humidity is 0.30. Accordingly, a room housing the adsorbing core 20 (or 30) and the evaporative condenser 60 (or 70), namely a room formed by the adsorbing core chamber 62 (or 63), the communicating section 86 (or 87) and the evaporative condenser chamber 66 (or 67) is restrained to be fallen in pressure. Hence, amount of water evaporated by the evaporative condenser 60 (or 70) is reduced, and the latent heat of evaporation taken from the heat exchanger fluid is reduced, consequently the air conditioning capacity comes to fall.

In the above-mentioned embodiment, the evaporating time of 3 days are described. This evaporating time is preferably selected from the range of about 48–80 hours. When said time is less than 48 hours, a solutions is not so easily evaporated that it may cause a ununiform pore size distribution. On the other hand, when said time is more than 80 hours, as a polymer having amide group is apt to be aggregated, pore size of a resulting polymer becomes too large. Heating temperature for evaporating said solution is preferably in the range of 50~60° C.

As a monomer used for polymerization in the reaction system, N-acryloylmorpholine, N,N-diethylacryamide, N-isopropylacrylamide can be also used to prepare a porous body having pore volume of not less than 0.2 $cm^3$/g at pore size of 0.6~1.6 nm.

In another preferred embodiment to prepare a porous body as described, a porous body S may be obtained by adding prepolymerized hydrophilic polymer to said metallic compound as follows:

Tetramethoxysilane and 35% hydrochloric acid (acid catalyst) were added to methanol solution of polyvinylprrolidone (weigh-average molecular weight of about 40000) and the resulting mixture was stirred at room temperature for 24 hours to hydrolyze and polymerize. Then, the resulting, homogeneous solution was left at 60° C. for 3 days so as to evaporate the solution. Consequently, a colorless, transparent and gellic solid was obtained. Then, a resulting complex was fired at 450° C. for 24 hours. A porous body (average pore size of 0.7 nm), which has pore volume of 0.36 $cm^3$/g pore size of 0.6~1.6 nm, was obtained. Average pore size and pore volume were determined by nitrogen adsorption method.

As a polymer which is added to said metallic compound, polyamide having a intramolecular carboxyl group, polyether having a intramolecular hydroxyl group or polyether having a intramolecular carboxyl group may be used.

Further, as said metallic compound, for example, silica or alumina is preferably used. Especially, a metallic compound preferably contains a three-dimensional, fine network structure where a certain hydrophilic polymer is uniformly dispersed.

A reagent such a polymerization initiator, an acid catalyst may be properly selected according to selections of said monomer, polymer and metallic compound. As for the chilling of the heat exchanging fluid, for example, it may be chilled by an air-cooled type heat exchanger accommodated outside, differing from the way, which is chilled by the adsorbing core cooler, in a above-mentioned embodiment. Type of radiator is not also restricted in particular. Further, when water is desorbed from adsorbent, said adsorbent may be heated directly by heating means, e.g. heater.

As above mentioned, the adsorbent in the present invention adsorbs water at low temperature and high humidity, and desorbs water at high temperature and low humidity.

In this embodiment, as described, the adsorbent is a porous complex consisting of an organic compound which is sol-gel phase transitionable by temperature changes and an inorganic compound having a three-dimensional network structure. Said organic compound is dispersed in said structure.

An organic compound is, for example, a cross linked polymer of N-isopropylacryamide and N,N'-methylenebisacrylamide, having a intramolecurar hydrophilic group and hydrophobic group, and it has a sol-gel phase transition temperature of 35° C.

An inorganic compound is, for example, a porous body of silica, having a three-dimensional network structure. The adsorbent has a pore size character of pore volume 0.22 $cm^3$/g pore size 1.0~1.5 nm. Said adsorbent is, for example, prepared as follows:

First, 20 $cm^3$ of methanol solution including 0.9 g of N-isopropylacrylamide, 0.1 g of N,N'-methylenebisacrylamide as a crosslinling agent, and 15 mg of 2, 2-azobisisobutyro nitrile was prepared. After 1.0 g of poly (N,N-dimethylacrylamide) is added to this methanol solution. 2.0 g of tetramethoxysilane and 0.5 cm of hydrochloric acid are also added and then stirred at room temperature for 24 hours. Thereafter, this solution was left at 60° C. for 7 days to evaporate solvent. The resulting transparent gel was dipped into water for 72 hours to extract poly (N,N-dimethyacrylamide) by Soxhlet extraction.

In this way, a porous body of silica was prepared, having a three-dimensional network structure. This adsorbent is a porous complex in which a crosslinked polymer of N-isopropylacrylamide and N,N'-methylenebisacrylamide is dispersed.

FIG. 5 shows water adsorption isothermal lines of this adsorbent, having more outstanding adsorption capacity in comparison to silica gal.

What is claimed is:

1. A process for producing an adsorbent comprising the steps of:

mutually dissolving an organic compound which is phase transitionable for sol-gel by temperature changes with a solvent extractive organic compound in a three-dimensional network structure of an inorganic compound to obtain a complex containing said inorganic compound, said transitionable compound and said solvent extractive organic compound; and extracting said solvent extractive organic compound with a solvent from said complex to form a porous body;

wherein in the step of obtaining the complex, an uncrosslinked organic which may be sol-gel phase transitioned is crosslinked in the presence of said inorganic compound and said solvent extractive organic compound.

* * * * *